US011109584B2

(12) United States Patent
Bonamico et al.

(10) Patent No.: US 11,109,584 B2
(45) Date of Patent: Sep. 7, 2021

(54) METHOD FOR THE APPLICATION OF PRODUCTS IN LIQUID OR SEMILIQUID STATE, SUCH AS CHEMICALS FOR AGRICULTURAL USE AND THE LIKE, USING A ROTATING ATOMIZER DEVICE (71) Applicant: Mercedes Bonamico, Laboulaye (AR)

(72) Inventors: Guillermo Luis Bonamico, Laboulaye (AR); Guillermo Ever Brizzio, General Levalle (AR)

(73) Assignee: Mercedes Bonamico, Cordoba (AR)

( * ) Notice: Subject to any disclaimer, the term of this patent is extended or adjusted under 35 U.S.C. 154(b) by 0 days.

(21) Appl. No.: 16/315,526

(22) PCT Filed: Jul. 3, 2017

(86) PCT No.: PCT/EP2017/066509
§ 371 (c)(1),
(2) Date: Jan. 4, 2019

(87) PCT Pub. No.: WO2018/007322
PCT Pub. Date: Jan. 11, 2018

(65) Prior Publication Data
US 2019/0313624 A1 Oct. 17, 2019

(30) Foreign Application Priority Data
Jul. 4, 2016 (AR) .............................. P20160102021

(51) Int. Cl.
*A01M 7/00* (2006.01)
*B05B 12/16* (2018.01)
*B05B 3/02* (2006.01)

(52) U.S. Cl.
CPC ........ *A01M 7/0089* (2013.01); *A01M 7/0014* (2013.01); *B05B 3/02* (2013.01); *B05B 12/16* (2018.02)

(58) Field of Classification Search
CPC .......... B05B 12/16; B05B 12/18; B05B 3/02; B05B 3/22; B05B 3/105; A01M 7/0089; A01M 7/0014; A01M 7/0003
(Continued)

(56) References Cited

U.S. PATENT DOCUMENTS

RE31,023 E * 9/1982 Hall, III ................. A01D 46/24
  137/236.1
4,609,145 A * 9/1986 Miller ................. A01M 7/0014
  239/159

(Continued)

FOREIGN PATENT DOCUMENTS

CN  101121158 A  2/2008
CN  203620824 U  6/2014
(Continued)

OTHER PUBLICATIONS

International Search Report dated Oct. 19, 2017 re: Application No. PCT/EP2017/066509, pp. 1-5, citing: U.S. Pat. No. 4,609,145 A, U.S. Pat. No. 6,152,382 A, KR 101 219 017 B1 and US 2002/ 100815 A1.
(Continued)

*Primary Examiner* — Joseph A Greenlund
(74) *Attorney, Agent, or Firm* — Defillo & Associates, Inc.; Evelyn A Defillo (57) ABSTRACT

The purpose of the present disclosure is to provide a method for application of products in liquid or semiliquid state, such as chemicals for agricultural use and the like, using a rotating atomizer device, in such a way that the drops shall fall downwards in the form of fog over the crops due to the action of the force caused by its mass and gravity, in addition to the eventual momentum that centrifugal effect of the rotating parties that generate the drops may provide, wherein the method includes the following steps: individually regulate the voltage for the speed of the engines of each rotating (Continued)

atomizer device, modifying the parameter of the power supply of the engine to ensure that the speed of each rotating atomizer device is the correct one, measure the speed of the engine under its control and correct any deviation or separation from the programmed operating values.

9 Claims, 5 Drawing Sheets

(58) Field of Classification Search
USPC ................................................ 239/7, 67, 77
See application file for complete search history.

(56) References Cited

U.S. PATENT DOCUMENTS

| | | | | |
|---|---|---|---|---|
| 4,823,268 | A * | 4/1989 | Giles | A01M 7/0089 239/77 |
| 5,315,564 | A * | 5/1994 | Upton | G01S 15/04 239/77 |
| 5,373,990 | A * | 12/1994 | Ballu | A01M 7/0014 239/77 |
| 5,768,128 | A * | 6/1998 | Thompson | A01B 79/005 702/2 |
| 5,921,019 | A * | 7/1999 | Baek | A01M 7/0014 47/1.7 |
| 6,152,382 | A * | 11/2000 | Pun | A01M 7/0014 239/11 |
| 6,202,941 | B1 * | 3/2001 | Baek | A01M 7/0075 239/161 |
| 6,786,701 | B1 * | 9/2004 | Huang | F24F 6/14 417/199.1 |
| 10,149,468 | B2 * | 12/2018 | Crinklaw | A01M 7/0014 |
| 2002/0100815 | A1 * | 8/2002 | Doebler | A01M 7/0089 239/67 |
| 2006/0214022 | A1 * | 9/2006 | Caccaviello | B05B 13/005 239/172 |
| 2011/0160920 | A1 * | 6/2011 | Orr | E02F 9/24 700/283 |
| 2012/0085836 | A1 * | 4/2012 | Tiu | B05B 13/0278 239/77 |
| 2013/0110357 | A1 * | 5/2013 | Peterson | A01M 7/0089 701/50 |
| 2014/0047916 | A1 * | 2/2014 | Schmidt | G01F 1/05 73/197 |
| 2014/0306030 | A1 * | 10/2014 | Omiatek | B05B 7/2489 239/263.1 |
| 2015/0272106 | A1 * | 10/2015 | Schertz | B05B 12/008 239/11 |
| 2016/0150744 | A1 * | 6/2016 | Lin | A01M 31/002 43/107 |
| 2018/0160670 | A1 * | 6/2018 | Pellenc | B05B 7/0466 |
| 2019/0313623 | A1 * | 10/2019 | Bonamico | A01M 7/0021 |
| 2019/0313624 | A1 * | 10/2019 | Bonamico | A01M 7/0028 |

FOREIGN PATENT DOCUMENTS

| | | |
|---|---|---|
| JP | 2012223706 A | 11/2012 |
| KR | 101219017 B1 | 1/2013 |

OTHER PUBLICATIONS

Written Opinion dated Oct. 19, 2017 re: Application No. PCT/EP2017/066509, pp. 1-5, citing: U.S. Pat. No. 4,609,145 A, U.S. Pat. No. 6,152,382 A, KR 101 219 017 B1, C 101 121 158 A and US 2002/100815 A1.

* cited by examiner

ME THOD FOR THE APPLICATION OF PRODUCTS IN LIQUID OR SEMILIQUID STATE, SUCH AS CHEMICALS FOR AGRICULTURAL USE AND THE LIKE, USING A ROTATING ATOMIZER DEVICE

TECHNICAL FIELD

The present disclosure refers to a method for application of products in liquid or semiliquid state, such as chemicals for agricultural use and the like, using a rotating atomizer device, in such a way that the drops shall fall downwards in the form of fog over the crops due to the action of the force caused by its mass and gravity, in addition to the eventual momentum that centrifugal effect of the rotating parties that generate the drops may provide.

BACKGROUND

Even though there are many types of phytosanitary sprayers, going from aerial and/or land sprayers, with different means of propulsion that reach partial purposes such as controlling the direction of the drops, the amount of the insecticide vested in the area to be applied (with the airflows generators), at present there exists no device for a land sprayer that achieves the efficient application of the agrochemical or phytosanitary.

In the field of the agriculture, there are different types of problems to be solved regarding the specific characteristics of the fumigation activity, including the inefficiency of weed and insect control through the application of phytosanitary chemical products by hydraulic pickaxes, ecological problems, consequences in people's health, excess of phytosanitary product to reach a good and efficient control, excessive water consumption, excessive cost in replenishment of machines, product waste that falls down on the ground and the pollution this causes, drift of the phytosanitary product, pollution of non-desired places (populations, fields, boundaries, rural schools and other places with danger to the population).

In the embodiment proposed in the present disclosure, we disclose a rotating atomizer device for drop generation capable of maintaining the drops size constant to deposit it directly in the target plant population to be controlled, as it minimizes the contamination of water systems, allows the control of the drift towards pen-urban areas, allows an efficient control with a lesser quantity of chemical product, minimizes the consumption of water as it applies the product with greater concentration, significantly increases the active cycle of the spraying machine and achieves an application of the agrochemicals with controlled drop sizes and amount per square centimeter of surface to be sprinkled.

During the XX century and insofar this XXI century, the world population shows a fourfold increase, passing from 1650 million to 7500 million inhabitants. This has only been possible with the global food production accompaniment that has been mainly boosted due to the extension of agricultural frontiers and the improvement of the crop protection systems.

This increase of food production has been carried out despite the action of the different pests that have accompany agriculture since its beginnings and in order to reach it the contribution of the phytosanitary chemical products has been essential.

The technology of current application is not so different from the one used since the beginning of the XX century. However, the mechanical process used to divide the chemical product in liquid state into drops that must be deposited over the plant population target of the sanitary treatment is still the same. The breakthrough technology of the liquid mass compacts into drops when pressure passing through an opening still offers the same usual adverse characteristics: a) deficient control of drop size; b) high heterogeneity of drop size. These deficiencies are the main reason of inefficient applications.

When spraying the plant population target of the sanitary treatment, part of the drops, the bigger ones, shall fall on the ground as they are not adhered to the plant leaves, this process of transference of phytosanitary chemical products to the ground, also called endo-drift, is transformed into product waste and in a significant environmental impact. This process of endo-drift may be deepen when applying the product over the crops with low foliage development as well as in crops with an important foliage development to which a very high dose of phytosanitary product is applied with the intention of reaching the proper amount of drops in the bottom part of the plant. Richard Courshee in Some Aspects of the Application of Insecticides, Annual Review of Entomology, Vol. 5: 327-352 (Volume publication date January 1960), reports such extreme cases that only the 20% of the applied chemical product remains in the plant, depositing the 80% on the ground.

Extremely small drops, in general of 100 microns (um) of a diameter or less (lower), depending on the conditions both of application, for example the distance to be covered from the element generating the drop up to the leaves of the plants target of the sanitary treatment, and on climatic conditions such as temperature, ambient humidity and wind speed, shall also be lost, either by evaporation or pneumatic transport outside the area in which the plant population to be treated is placed, affecting the neighbor non-target plant populations, damaging plant and animal organisms external to the phytosanitary process that is taking place.

As mentioned above, it has been proved that drops of a size smaller than 100 um of diameter have a high probability of being dragged by wind or being evaporated before reaching the target, which depends on the discharge height and the climatic conditions (wind speed, relative humidity and temperature). Both situations, dragging and/or evaporation, are contemplated within the phenomenon called exo-drift (Planas de Marti 1992; Doble et al. 1985; Miller and Hadfield 1989). This transport process generates serious consequences: decreases in the crop yield; repetition of treatments; induction to resistance on the part of the organisms to be controlled; damages to sensitive crops; direct damages to people and animals due to drifting exposition and indirect damages due to the consumption of contaminated food; rejection of products in the markets due to the presence of waste; delimitation of exclusion areas based on high urban pressure; lawsuits; etcetera. (Matthews 1985; Gil Moya 1993, Thronhill et al. 1995, 1996; Marrs et al. 1993).

According to Msc. Eng. Agr. Gerardo Masia of the Rural Engineering Institute (INTA Casterlar) in his lecture of the First National Seminar of Technologies for the Application of Phytosanitary (in Las Parejas, Santa Fe; Aug. 9 to 11, 2011). "In general terms, the effectiveness of the applications is about 40%, that is to say, every 100 drops that leave the application equipment only 40 are deposited in the target to be controlled. In another words, considering a tank of 4000 liters of capacity, 2400 liters do not reach the target, where they are deposited: a) evaporation; b) ground; c) neighbor crops; d) human beings".

At present, the application of phytosanitary products made with land machines, both self-propelled and dragging machines, is made with hydraulic pickaxes. Although this type of application is technically correct, the limitations of this technology in the generation of drops of uniform size prevent the minimization of non-desired phenomena both of exo-drift and of endo-drift. This way of drop generation, by making that a compact liquid passes through an opening at a sufficiently high pressure so that when crushing with the atmospheric air, transforms the above-mentioned compact liquid into a set of drops of different size. The universe of drops generated through this system is formed by a dimensional spectrum of a great diversity. The size of the generated drops includes a spectrum of 30 um the smaller to 1000 um the bigger.

In Lefebvre, A. H. Atomization and Sprays, Combustion: an International Series, Taylor & Francis, USA 1989 "The important properties of the liquid in the atomization process are the surface tension, the viscosity and the density. Basically, the atomization is produced as a result of the competence between the stabilization influences of the surface tension and the viscosity and the destabilizing actions of the different internal and external forces."

Regulation ASAE S-572 of Kirk, USDA characterizes the universe of drops according to their diameter as follows: drop smaller than 182 um: very fine; drop between 183 um and 280 um; fine; between 282 and 429; medium; between 430 and 531: thick; between 532 and 655: very thick; bigger than 655 um: extremely thick.

From the point of view of the efficiency of the sanitization process it should be achieved that an amount of drops of a specific and homogeneous size is deposited over the target. Even though the amount of drops per cm2 and their size may vary according to the chemical product used, it is known that the smaller drops of the generated spectrum will not reach the target because of the phenomenon called exo-drift and the bigger drops will neither do it because of the phenomenon called endo-drift.

In this manner, the proper drop size for a correct application is between 170 um and 270 um of diameter since a good penetration in the plant population target of the treatment can be obtained, minimizing the endo-drift and exo-drift.

The breakthrough mechanisms by pressure in the opening (system called by hydraulic pickaxes), apart from the variations in the drops size that is possible to achieve through changes in the pressure and diameter of the openings, produces inherently a great dispersion in the generated drop sizes contravening the main purpose of the process that is to achieve drops of an homogeneous size. One of the ways of valuing this phenomenon (of uniformity of drop size) is the dispersion factor. The dispersion factor (DF) is a calculation between the medium volumetric diameter and the medium nominal diameter (relation MVD/MND).

Regarding this field, several solutions have been proposed to the different problems which main purpose has been to solve the application of insecticides (phytosanitary) in the fields under secure and sanitary conditions, both for themselves and for the people and environment. Even though they could not encompass all these matters at the same time.

It is worth mentioning that there are different solutions to above-mentioned problems, such as for example the patent AR 090373 (A1) owned by BAZAN REMO ADRIAN, that describes a rotating atomizer with regulator of the drop size in real time through an automatic electronic device. It claims a rotating atomizing device with control of drop size exclusively for aerial spraying, wherein the power supply that propels the rotor in charge of the liquid atomization, include a variable pitch propeller activated (related to) by the speed to which the plane is moved (more than 250 km/h).

As a difference with the above mentioned antecedent, the disclosure herein disclosed includes a rotating atomizer device for the generation of drops of low volume for the use in dragging or self-propelled machines exclusive for the land spraying, in which the power supply that propels the rotor in charge of the liquid spraying, is a variable speed electric engine (of the BLDC type). It is unfeasible that said propellers in charge of the rotation of the rotor, proposed by the antecedent, can rotate faced to the wind concerning the advancement (reach) of a land pulverization at 16 km/h.

In this manner, the antecedent of the control of the drop size shall be produced varying the speed of the rotor that at the same time shall modify the incidence angle of the blades of the propeller. Once the blades of the propeller are placed in the correct position, the engine stops until it is necessary to make a new correction. Furthermore, said system has been designed for rotating hamper, not for rotating disc as is proposed in the present disclosure; The discs are used for small flows (in the order of 2 lt/minute (minimum) maximum), instead the hampers that are used in planes are for much higher flows in lts minute (h) considering that a land machine sprays 50 ha/hr and a plane 400 hs/hr. It is not possible to generate uniform drops with rotating hampers for flows below 2 lts/minutes (h).

At the same time, in the antecedent no type of flow control is mentioned.

In particular, said antecedent differs from the disclosure herein disclosed in terms of: 1) MACHINE IN WHICH IT IS INSTALLED: It refers specifically to a mechanism for the generation of drops for use in planes that cannot be realised in land machines and vice versa, the disclosure herein disclosed refers to a mechanism that is only applicable for land spraying and is not suitable for plane use; 2) SPECIFIC PURPOSE: it refers to a measurement system of RPM of the propeller and a motorized mechanical system to modify the crossing of the blades of the propeller, making through a software an evaluation of the deviation of the programmed speed and modifying if necessary the angular position of the blades to restore the programmed rpm. In case of the purpose of the present disclosure, it is a generator of low volume drops, regulating the rotation speed of a rotating atomizer disc propelled by a low power electric engine of low voltage and direct current without brushes, that in no way could spray the amount of liquid that the perforated double cage atomizer used in the planes for aerial spraying atomizes; 3) TYPE OF ATOMIZER: it is coupled over a rotating atomizer of perforated double hamper; instead, the present disclosure refers to a plate rotating atomizer; 4) ENERGY NECESSARY TO "BREAK" A COMPACT LIQUID INTO PARTICLES (DROPS): the energy is provided by propellers mounted over the same axis of the set of atomizing hampers. It is the high speed of the vehicle over which the devices for the generation of drops are coupled that allows that the mechanism rotates at the necessary speed. Instead, in the purpose of the present disclosure, the energy in charge of the rotation of the plate is provided by an electric micro engine of direct current without brushes (BLDC) and over the axis of said engine, the plate is coupled. It is an engine which individual power does not exceed 50 W and the aggregated power of all the micro engines does not exceed one (1) HP of mechanical power. In the case of the antecedent, the only information in real time that enters the software of control is the rpm of the propellers (and of the hampers). Based on this only information and on the supposition that all the physical parameters of the agrochemical and the flow remain constant, the correction of the angular positions of the blades of the propellers is carried out with the purpose of maintaining the programmed rotation speed.

In the antecedent document, it has been stated that when the rpm are maintained, the drop size can be controlled. However, said reasoning has not foreseen the circumstance that the variations of the other parameters (flow, surface tension, temperature, density and viscosity), also influence in the size of the drops, and consequently, as they were not incorporated, they are not including the correction of the effect that they produce in the drop to be sprayed.

The flow may vary accidentally or intentionally and upon the variation of the temperature of the product, its physical properties (density, surface tension and viscosity) also vary. When said parameters undergo variations, they shall affect the manner in which the drops are formed in a rotating atomizer; the way of correction of these deviation of physical parameters of the product shall be varying the rotation speed according to the equation of Tanasawa. In order to carry out said correction, the software shall permanently recalculate the rotation speed.

The antecedent only mentions the constant maintenance of the rpm in order to maintain the drop size constant, ignoring the effects of the changes in the instantaneous flow and of the temperature over the size of the generated drops.

The temperature of the chemical product to be atomized shall also affect the functioning of the mechanical flow regulators (they are partial obstruction devices of an opening through which the chemical product shall pass), if as a consequence of the increase of the temperature the physical characteristics of the chemical product vary, this will affect the flow (that the antecedent does not measure) and even if it is measured it does not mention that its disclosure has the capacity of operating over it to correct eventual deviations.

As a difference with the antecedent, the purpose of the present disclosure to comply with the purpose prescribed in by the agricultural specialist as regards the drop size and flow/hectare, it not only measures the instantaneous rotation speed (as is the case of the mentioned antecedent) but also measures the instantaneous temperature of the chemical product to be sprayed and its instantaneous flow, thereby, applying the equations of Tanasawa in real time it determines the rotation speed that will produce the programmed drop size for the programmed flow, with permanent corrections in order to really maintain the programmed drop size.

Pages 11/32 of the application of the antecedent document state "that the software interface enables monitoring from the cabin the desired size, which allows the adaptation to the climatic variations such as wind, humidity and temperature".

The difference is that the antecedent takes for certain the fact that at a determined speed of rotation a determined drop size shall be produced without considering if the physical characteristics of the chemical product to be sprayed vary (density, surface tension and viscosity) as a consequence of its own changes of temperature or by a voluntary or involuntary modification of the flow. When in fact, users of these phytosanitary products have experienced during these years that the drop size not only depends on the rotation speed but also depends on the flow and the physical characteristics of the chemical product to be sprayed.

On the other hand, the patent document BR PI 2006/0501703-3 A owned by Alberto Samaia Neto, describes a Spraying device with a rotating system applicable in agricultural implements. Said document refers to a phytosanitary use and is for boom, the disc is also cylindrical and upwards, as a difference with the purpose of the present disclosure that claims a tapered disc and downwards. The only specification that the engine has is that it must be of the "proper capacity". It mentions that the apparatus is intended to the production of drops of a size of between 300 and 400 microns of diameter, as a difference with the present rotating atomizer device that claims a range of drops between 170 up to 270 microns of diameter, the antecedent produces drops outside the spectrum claimed herein. Furthermore, a fixed upside down dry cavity and another face up dry cavity of a slightly bigger diameter are mentioned, the smaller within the bigger one, but without touching each other. The bigger one placed in the lower area is the one in charge of rotating and producing the drops, which shall cause a dispersion of the drops size much bigger than the one described with the actual plate in the present disclosure and consumption of increased power of the engine.

At the same time, the antecedent mentions that the coverage of each unit is between 2.1 m to 2.3 m, that is due to the fact that the drops between 300 and 400 microns have more kinetic energy and travel more radial distance before falling. In the purpose of the present disclosure the plates are evenly spaced at a distance between 1.00 m and 1.40 m, almost half and the drops are always below the 300 microns of diameter.

Furthermore, it mentions an hectare flow of 15 to 40 lts/ha, that in the present disclosure is below 15 ltd./ha.

It also mentions the possibility of an electric controller that allows the selection of the hectare flow (lts./ha) and the proper drop size, independently of the advancement speed of the vehicle. It does not mention the relation between the drop size and the rotation speed that is inversely proportional, that is, that at a higher speed of rotation the smaller the drops size.

Said antecedent does not mention the possibility of correction due to factors such as flow, viscosity, surface tension or density.

It does not mention the possibility of correction due to variations of the above mentioned variables in light of changes in temperature.

It does not mention the way in which the speed control of the engine shall be done nor if this control is individual or joint.

It does not mention the control of the flow through any device nor does it mention if the regulation of the flow is individual or joint, it only makes reference to the fact that the flow is increased by increment of the pressure of the pump that supplies the chemical product.

At the same time, patent CN 2014/203620824 (U) owned by WUXI XUELANG ENVIRONMENTAL TECHNOLOGY CO LTD, claims a Disc for special atomization for rotation sprayer. It refers to an atomizing disc such as the ones used in the dairy industry to spray milk in the equipment for manufacture of powdered milk. Apparently, the main advantage lies in the possibility of being disassembled, in that the parts that are deteriorated over time can be easily replaced.

It is not mentioned for agricultural applications nor does it mention the range of drop size, the flow or the possibility of controlling neither of them.

Furthermore, the patent document JP 2012/223706 (A) owned by YONEHARA TAKASHI, YONEHARA OSAMU and YONEHARA HIRO, referred to an atomizer and a rotating spray method. It refers to a disc rotating atomizer which main characteristic appears to be that it has a fan for the generation of an airflow that propels the drops formed by the disc. In the case of the present disclosure it does not generate airflows. Said antecedent does not specify an agricultural use.

And patent US 2014/0306030 A1 owned by CLARKE MOSQUITO CONTROL PRODUCTS, INC., that claims a Sprayer of insecticide and mounting of spraying rotating head. It refers to the spraying of insecticides in areas with mosquito and specifies an objective drop size smaller than 50 microns of diameter, using one at a time. As a difference with the antecedent, the purpose of the present disclosure is to generate drops bigger than 150 microns of diameter.

BRIEF DESCRIPTION OF THE DRAWINGS

In order to facilitate comprehension and clarity the purpose of the present disclosure, it has been illustrated in several figures, in which it has been represented in one of the preferred embodiments, all by way of example, wherein.

DETAILED DESCRIPTION OF THE DRAWINGS

Making reference to FIGS. 1 to 5, the method herein described allow achieving the purpose proposed interconnecting at least 2 (two) rotating atomizer devices, such as those defined in the patent application of the same owner, with the control panel and the software protocol.

The purpose of the present disclosure and its form of use include at least a) 2 rotating atomizer devices, b) an interface unit man-machine, hereinafter HMI (human-machine-interface); c) an uninterrupted power supply with electric noise filtering, hereinafter UPS (Uninterruptible Power Supply); d) a data power/transmission wiring that links the rotating atomizer devices with the HMI, hereinafter wiring. Furthermore, it foresees a series of accessories related to a series of optional functionalities; e) GPRS; f) meteorology central. The method has been conceived to be used in spraying machines of land phytosanitary chemical products, both dragging or self-propelled, equipped with a boom (or support bar), oblong, mechanically linked to the machine that moves it transversally to its direction of travel so as to give support to the spraying units, at a proper height over the crop target of the phytosanitary treatment; the rotating atomizer device units shall be arranged at an equal distance of 1.20 m to 1.40 m with the purpose of producing a uniform distribution of the drops along the boom, all linked to the HMI through the wiring, this wiring shall comply with the double function of providing electric power of 12V of direct current to the rotating atomizer device (preventing that in a future the agricultural machines and tractors installations may be of 24V of direct current); the wiring shall also provide physical support for the communication of data among the rotating atomizer devices and the HMI; hardware (the amount and type of conductors, the levels of voltages of the signs, the frequencies, the modulation modes are defined) and software protocols (transmission protocols, form and size of packages, validation of data, security of information, type of encryption); it is foreseen that each rotating atomizer device be intelligent and self-diagnosable in case of failure of any unit, each rotating atomizer device is networked connected with the HMI that shall be in charge of sending the instructions and operating parameters for the execution of the work and also receiving the information coming from them to store it, process it, transmit it or generate the corresponding corrections and changes. The proposed method allows working through prescriptions, using a GPS we may know which is spatial location of the agricultural machine and managing said information in a digital file we may extract the right dose of the phytosanitary chemical that must be applied in each place and manage the flow limiters of each module to comply with what has been prescribed by the agronomic professional; it allows mapping, that is to assess from each rotating atomizer device what has been really done and add other data in a meteorology central and store all of them in a geo referential file; online connection in the internet (web based) in which the application can be controlled in real time and the possibility of generating alarms for any of the process parameters in such a way that the fumigation activity can be remotely controlled, including the operating parameters, drop size, flow, rotation speed, among others, as well as the maximum and minimum parameters that cause alarm signs and may be applied both for each rotating atomizer device in differentiated form or on a global basis for all the units. The rotating atomizer devices are directable in such a way that the rotation axis of the atomizers is both vertical and with a certain degree of inclination regarding the vertical.

The present disclosure essentially encompass a method for application of chemical products for agricultural use to crops that are under the device that generates the drops, in such a way that the drops shall fall downwards in the form of fog over the crops due to the action of the force caused by its mass and gravity, in addition to the eventual momentum that centrifugal effect of the rotating parties that generate the drops may provide. The regulation of the voltage for the speed of the engines of each rotating atomizer device, shall be individual, one for each rotating atomizer device. In this case, each shall receive the same tension (or voltage) of direct current, that may be of the type 12V, 24V, the electronic control board of each of them shall be in charge of modifying the necessary parameter of the electric source of the engine to ensure that the speed of each rotating atomizer device be the correct one, measuring the speed of the engine under its control to correct any deviation or separation from the programmed operating values. The method administers the drop size of each of the rotating atomizer devices through the speed of each of the engines to be able, for example, to obtain different effects (programmable purpose) in each segment of the boom, in the case of spraying next to the fencing that separates the neighbor crop, the speed of the units closer to the crop limit could be lowered to obtain therein bigger drops that due to their weight and geometry shall fall more quickly vertically minimizing the drift towards the neighbor crop.

Figure 1:
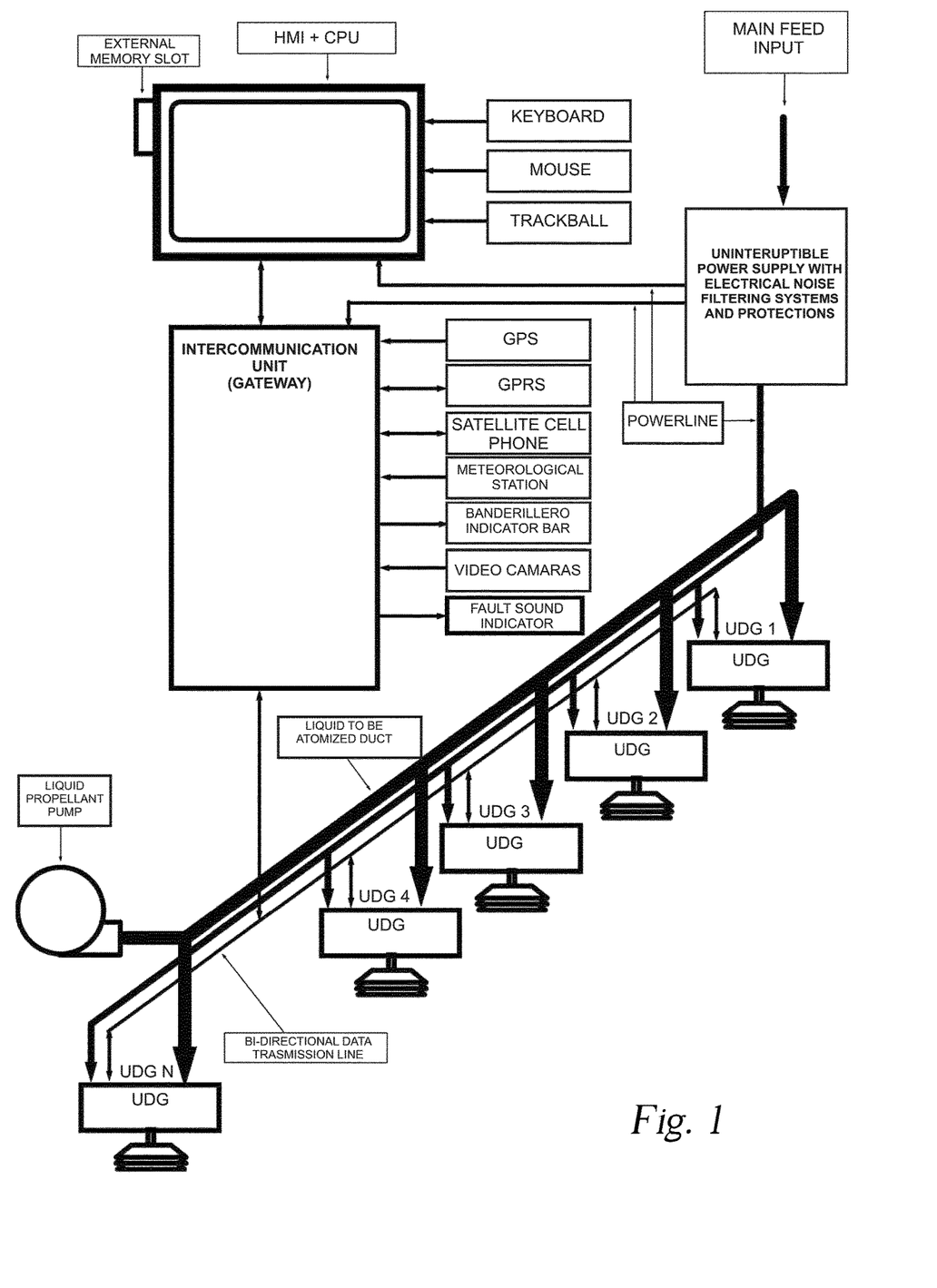
FIG. 1 shows a functional diagram of the method of the present disclosure.
Figure 2:
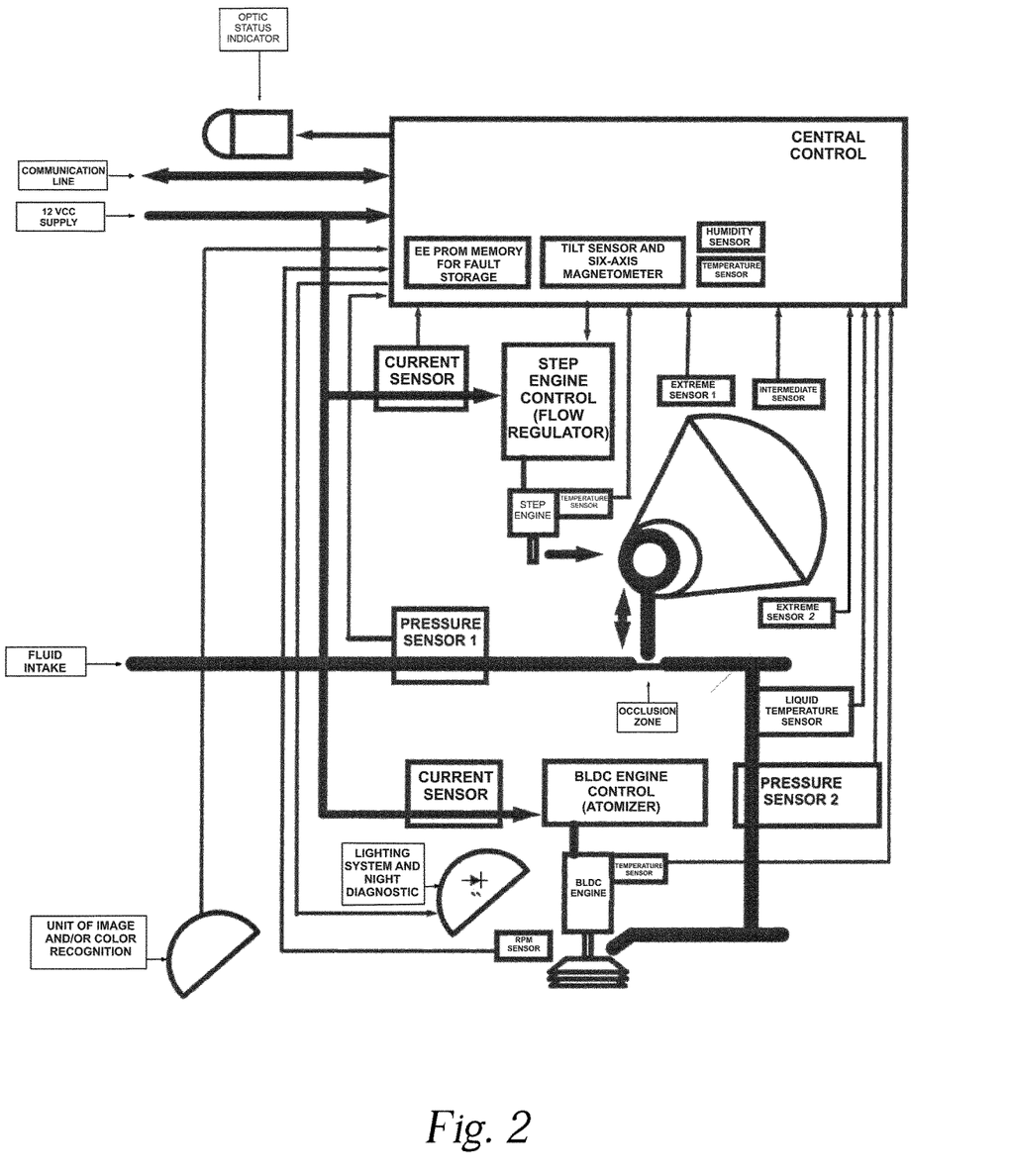
FIG. 2 shows a functional diagram of the rotating atomizer device with flow measurement by opening plate and measurement of pressure.
Figure 3:
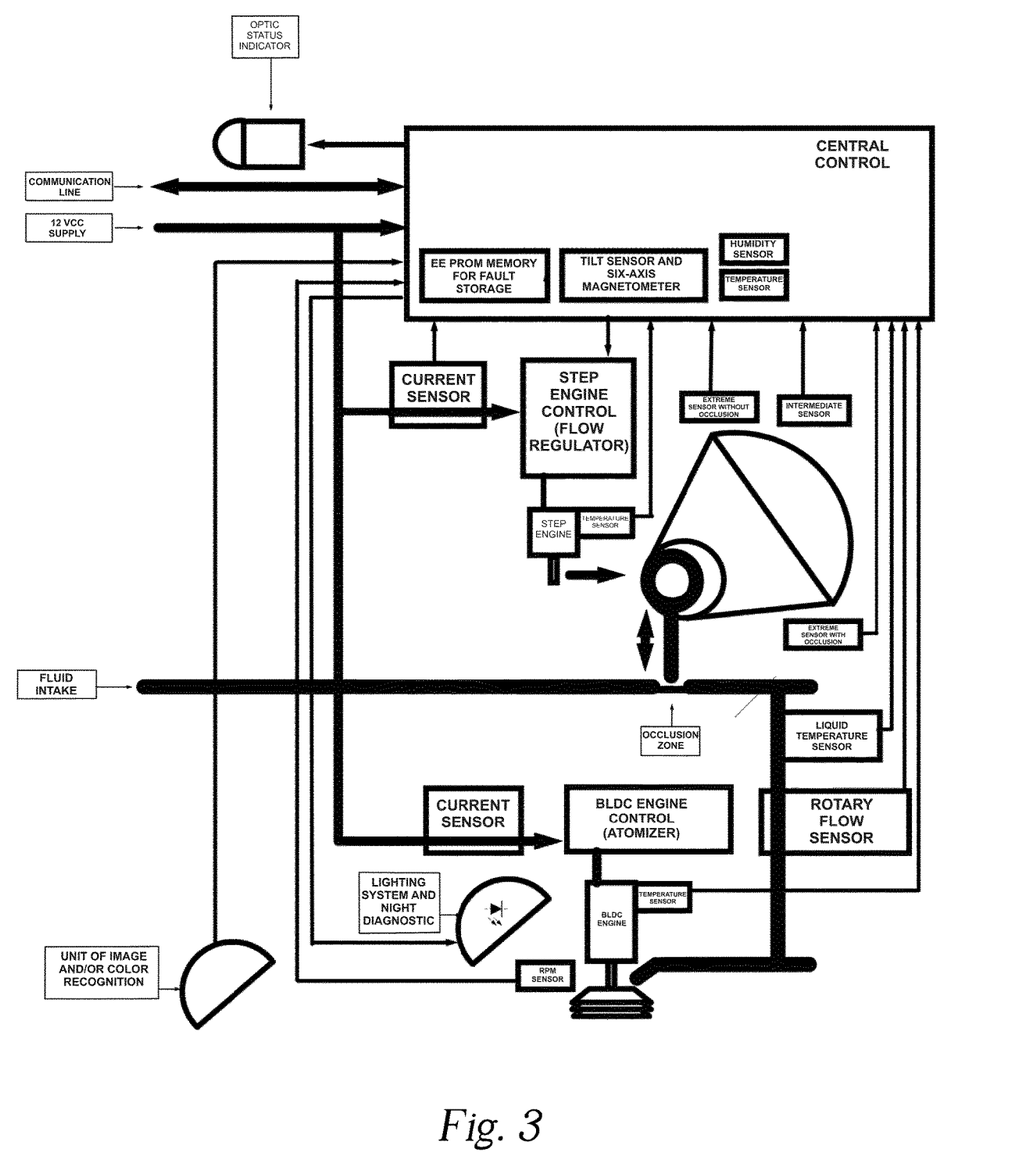
FIG. 3 shows a functional diagram of the rotating atomizer device with measurement of flow by flowmeter.
Figure 4:
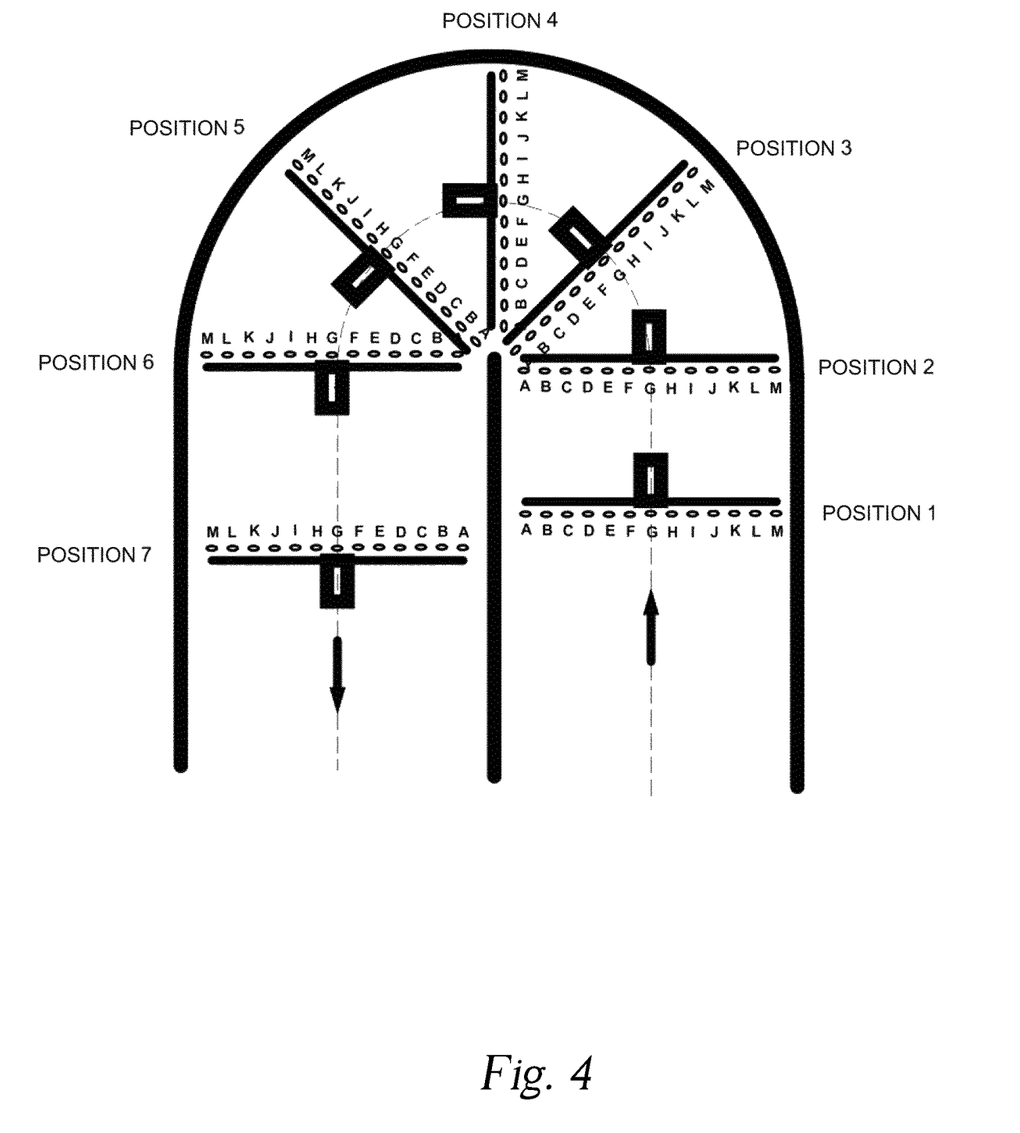
FIG. 4 shows a graphic of the rotation position of the spraying apparatus.

As one embodiment, the present disclosure solves the problem of the machine when rotating during fumigation, see FIG. 4, the vehicle moving forward on the right side, until reaching position 2, all the rotating atomizer devices, from A to M literally move forward at the same speed and since the separation between the rotating atomizer devices is constant, the flow per hour in lts./min of each rotating atomizer device shall be obtained from the equation: hectare flow [lts./ha.]×Velocity of the vehicle [km./hr.]×separation between the rotating atomizer devices [m.]×1000 [m./km.]

and flow per hour [lts./min.]=10000 [m.×m./ha.]×60 [min./hr.]. The same happens when the vehicle moves forward on the left side returning from position 6 henceforth, in both cases even if the driver lowers the speed, when approaching the end of the plot and increases it when moving away from position 6, in both cases all the rotating atomizer devices will be at the same speed.

This will not be so between positions 2 and 6, in this case the rotating atomizer device "A" shall be at a speed near zero and the speed of the rotation atomizer device "G" shall be the same as that of the vehicle and the one of the rotating atomizer device "M" shall be twice the speed of the rotating atomizer device "H".

In this case each rotating atomizer device knowing the speed of the vehicle that was sent through the data channel by the central monitor knowing its physical location in the boom taking the information of the accelerometer/magnetometer and the gyroscope shall determine its own speed and, based on this speed, it shall calculate its flow per hour and shall activate the flow regulator in order to sprinkle the hectare flow prescribed by the agronomic professional not only when the vehicle moves in straight line but also when it rotates.

Figure 5:
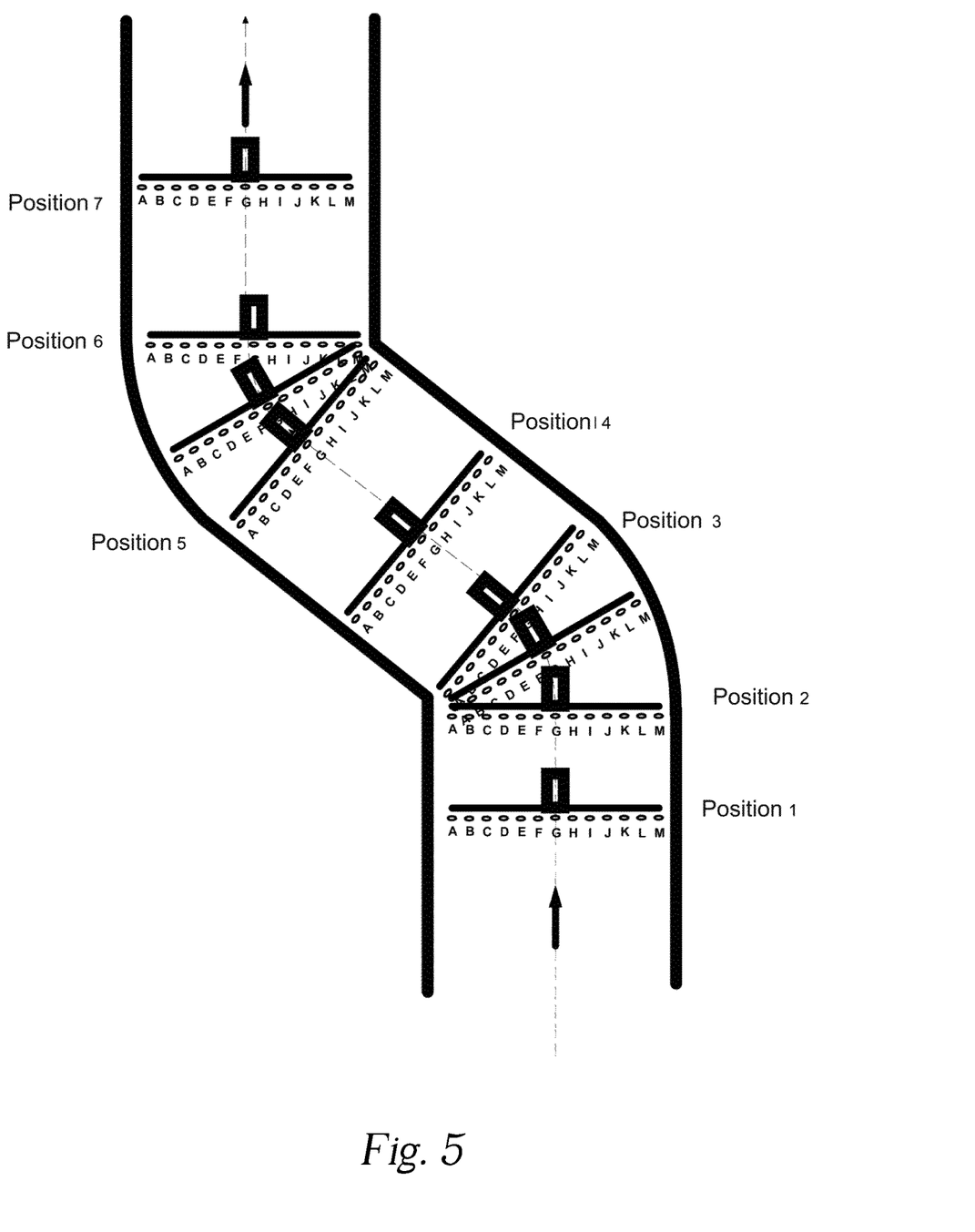
FIG. 5 shows a graphic of the change of course (deviation) of the spraying apparatus.

Something similar happens when the mobile must avoid an obstacle or the perimeter of the plot to be treated is irregular, the vehicle must rotate one way or the other, causing changes in speed of the rotation atomizer devices regarding the one of the vehicle, what in case it is not corrected through the proceeding described in the prior paragraphs shall cause an over-dosage in some areas and sub-dosage in other areas of the boom.

Furthermore, it includes sophisticated sensors to determine if there are or not plants under the boom and this way know if it is necessary to spray in this specific point or not. It is also formed by video cameras that distinguish if it is a useful plant (soya) or a useless plant (weed) in order to have a better utilization of the agrochemical. The electronic equipment may receive information from different sources both in real time and on a deferred basis with the purpose of establishing through the necessary algorithms the product flow and the drop size to be sprayed to reach the greater efficiency in the duty.

The reason why the use of this technique for the generation of drops that in all respects offers a great convenience for the application of phytosanitary chemical products has not been followed up has been the lack of engine technologies and their speed shifter/controls necessary to carry it out. This method could not work with hydraulic engines, nor with alternating current, or with turbines of any type.

In order to apply this technique for the generation of drops by centrifugation in which the size of the generated drops depends directly on the rotation speed and furthermore the system as a whole has a high availability rate (low rate of failures) simultaneously with a insignificant increase in the weight of the booms, it was necessary to have electric engines highly efficient in the consumption of energy, of low weight, high reliability (high MTBF), variable speed and highly controllable. There were no engines that fulfilled all these requirements.

During the last decade, the appearance of direct current engines without brushes (brushless) known as BLDC and the development of micro controllers with the processing capacity necessary to control their rotation speed (micro controllers of 32 bits and of 64 bits running at clock frequencies of more than 100 MHz) make their use possible nowadays.

At a greater pressure, smaller drop size, nor always advisable due to drift and evaporation, and at smaller pressure greater drop size, not advisable due to the fact that these big drops remain over the crop and do not penetrate their inside, where the insects, weed and diseases of the crop such as fungi are found. For a good application of the pesticide the drop that we shall use is not always the same depending on the type of phytosanitary we have to use to reach and hit the target to be treated.

It is not the purpose of this disclosure that any of the variables involved in the process for generation of drops is maintained constant (or still) since due to its climatic and/or physical nature all independent variables shall vary randomly and all dependent variables shall vary according to the equations that govern their functional dependence on the other variables involved. The purpose of the present disclosure is to correct the eventual separations that these random variations may produce in the final result of the phytosanitary treatment so that the application of the chemical products is carried out completely according to what has been prescribed by the agronomic professional.

It is important to highlight that the above mentioned embodiment, is only one of the many applications that the proposed methodology has, In effect, the proposed method may be applied among other possibilities to:

a) Humidity addition in greenhouses or even sprinkler irrigation of fine drops for plants that require this type of water contribution;

b) Humidity addition to air currents in hot/cold air conditioned units placing them in air ducts;

c) Application of liquid products that may be from fungicides to colorants and from flavorings to precipitating factors;

d) Application of lubricant and/or protective oily layers against corrosion, protecting oils for parts and metal sheets;

e) Application of phosphatizant, paint strippers and/or mordants in prior processes to the puncture in parts and metal sheets;

f) Application of adhesives in gluing processes in wood, glass, plaster, paper, etc., layers;

g) Low flow and high efficiency irrigation.

The invention claimed is:

1. A method for application of agrochemical products in a liquid or a semi-liquid state onto a crop, the method including the following steps:

mounting a rotating atomizer device on an agricultural machine, the rotating atomizer device including at least two atomizer devices, a controller; an uninterruptible power supply with electrical noise filtering; a data transmission/power cabling; a GPS module, and a meteorology center, wherein each one of the atomizing devices is connected to the controller, which in turn feeds each one of the rotating atomizer devices from a rotary direct current source, wherein said connection allows data communication between the rotating atomizer devices and the controller; wherein each rotating atomizer device is intelligent and self-diagnosing, each one of the rotary atomizer devices is network connected to the controller that is in charge of sending instructions and operating parameters for the execution of the application of the fluid and also receiving the information to store, process, transmit or generate corresponding corrections and changes; wherein the GPS module spatially locates the agricultural machine and manages information in a digital file in order to obtain an appropriate dose of the agrochemical products that have to be applied in each atomizer rotary device and manage flow limiters of each atomizer rotary device;

individually regulating a voltage for a speed of an engine of each one of the atomizer devices, modifying a parameter of a power supply of the engine to ensure that a rotation speed of each one of the atomizer devices is the correct one;

measuring the speed of the engine under control and correcting any deviation or separation from programmed operating values;

determining an application area, and through analysis thereof, regulating the rotational speed of each of the rotating atomizer devices;

producing drops of the agrochemical products in the form of a fog, wherein the size of the drops depends on the rotational speed of the rotating atomizer devices; and spraying the right dose of the fog onto the crop.

2. The method according to claim 1, further including the step of adding data in a meteorological center and storing into a geo-reference file; online connection on the Internet (web-based) in which the spraying step is in real time and generating alarms for any of the process parameters in such a way that the spraying step is remotely controlled, including the operating parameters, size drop, flow rate and rotation speed.

3. The method according to claim 2, further including the steps of receiving information from different sources both in real time and delayed in order to establish through algorithms a product flow and the size drop to be sprayed.

4. The method according to claim 1, further including the step of obtaining images through video cameras to determine a presence of plants or distinguish a useful plant from a useless plant to have a better use of the agrochemical.

5. The method according to claim 1, further including the step of administering a drop size of each of the rotating atomizer devices through the speed of each of the engines to be able to obtain different effects in each segment of a boom of the rotating atomizer device.

6. The method according to claim 1, further including the step of managing flow limiters of each rotating atomizer device to comply with pre-programmed values.

7. The method according to claim 1, further including the steps of assessing each rotating atomizer device and adding subsequent data, such as a meteorology center and storing all of them in a geo-reference file.

8. The method according to claim 1, further including the step of managing information in a remote manner connected online, on the Internet (web-based) allowing the control of the application in real time, and the possibility of generating alarms for any of the process parameters.

9. The method according to claim 1, further including the steps of remotely controlling the activity of application including the operating parameters, drop size, flow, rotation speed, as well as maximum and minimum parameters that cause alarm signals and applied both for each rotating atomizer device in differentiated form or on a global basis for all the rotating atomizer devices.

* * * * *